United States Patent [19]

Fujikawa et al.

[11] Patent Number: 4,846,010

[45] Date of Patent: Jul. 11, 1989

[54] TRANSFER CASE OPERATION MODE SHIFTING APPARATUS FOR A FOUR-WHEEL DRIVE VEHICLE

[75] Inventors: Satoshi Fujikawa, Kiroshima; Hideshi Hiruta, Aki, both of Japan

[73] Assignee: Mazda Motor Corporation, Hiroshima, Japan

[21] Appl. No.: 225,850

[22] Filed: Jul. 29, 1988

[30] Foreign Application Priority Data

Jul. 31, 1987 [JP] Japan .................. 62-193324
Jul. 31, 1987 [JP] Japan .................. 62-193325

[51] Int. Cl.⁴ ............................................. F16H 5/06
[52] U.S. Cl. .................................. 74/337.5; 180/249; 74/335
[58] Field of Search ................. 74/335, 337.5, 339; 180/249

[56] References Cited

U.S. PATENT DOCUMENTS

| 4,291,586 | 9/1981 | Buetemeister ................. 74/335 |
| 4,428,248 | 1/1984 | Bronckson et al. ............ 74/335 |
| 4,567,969 | 2/1986 | Makita ........................... 74/335 |
| 4,619,151 | 10/1986 | Trachman et al. ........... 74/335 |
| 4,664,217 | 5/1987 | Welch et al. ............. 74/337.5 X |

FOREIGN PATENT DOCUMENTS 890021  8/1953  Fed. Rep. of Germany ..... 74/332.5

Primary Examiner—Dirk Wright
Attorney, Agent, or Firm—Fleit, Jacobson, Cohn, Price, Holman & Stern

[57] ABSTRACT

A transfer case operation mode shifting apparatus is actuated by an electric actuator including an electric motor and a differential power transmitting mechanism which transmits a driving power for axially moving a differential gear shift member to shift a center-differential gear assembly between a four-wheel and a two-wheel drive mode of operation. The driving power transmitted by the differential power transmitting mechanism and acting on the differential gear shift means is smaller when shifting the center-differential gear assembly from the four-wheel to the two-wheel drive mode of operation than when shifting back the center-differential gear assembly from the two-wheel to the four-wheel drive mode of operation.

20 Claims, 8 Drawing Sheets

POSITION P2

POSITION P4L

POSITION P4F

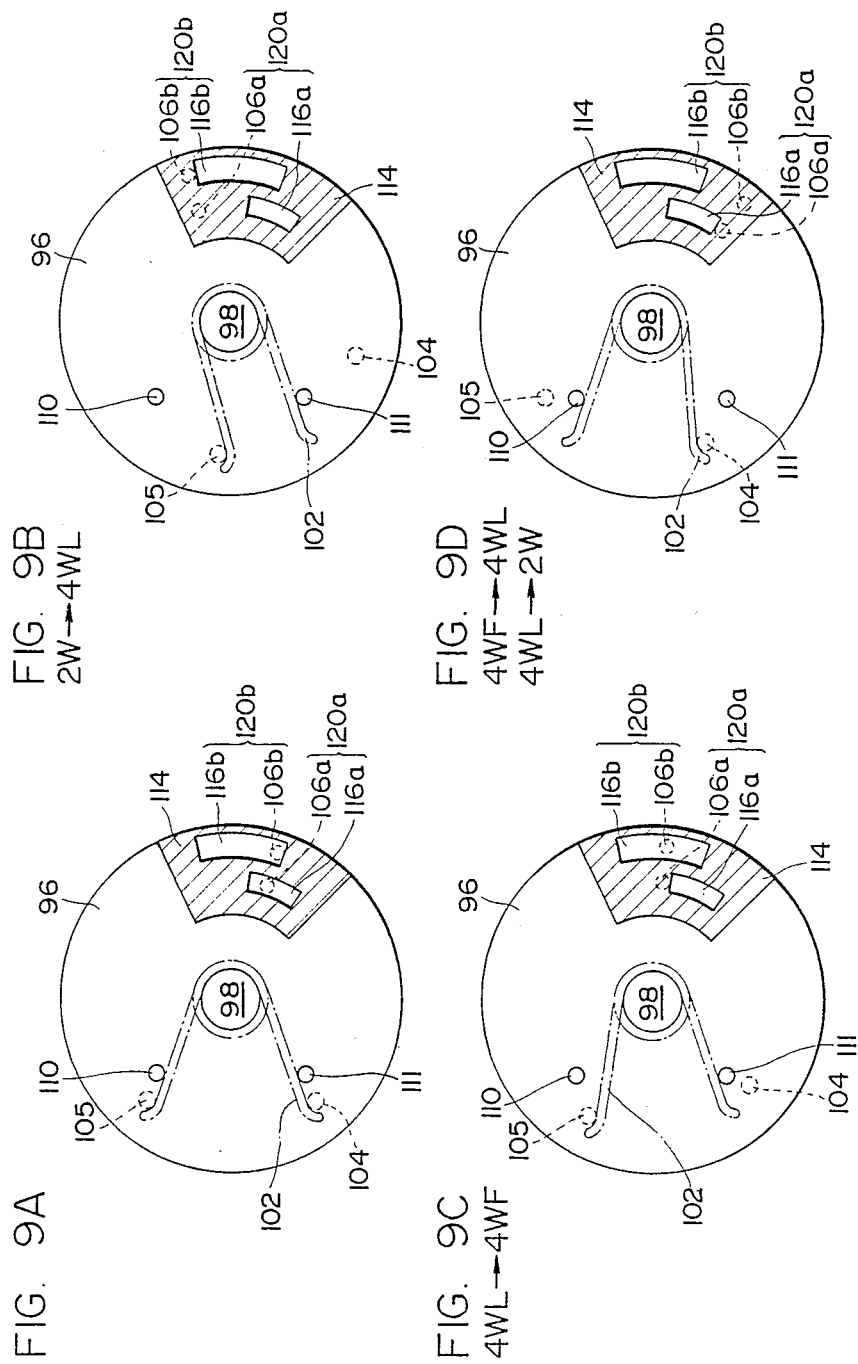

TRANSFER CASE OPERATION MODE SHIFTING APPARATUS FOR A FOUR-WHEEL DRIVE VEHICLE

FIELD OF THE INVENTION

The present invention relates to a transfer case for use in a vehicle equipped with four-wheel drive and, more particularly, to a transfer case operation mode shifting apparatus in which a center-differential is shifted between a two wheel and a four-wheel drive mode of operation and/or between a differential-locked and a differential-free drive mode of operation by means of an actuator.

BACKGROUND OF THE INVENTION

Transfer cases used on vehicles equipped with parttime four-wheel drive generally include transfer gear shift means for shifting a transfer gear assembly between a high and a low speed drive range, and center-differential gear shift means for shifting center-differential gear assembly between a differential-locked and a differential-free drive mode of operation and/or between a four-wheel and a two-wheel drive mode of operation. The shift means needs to be remotely operated within the driver's compartment to selectively shift the center-differential gear assembly to a desired drive mode of operation. For easy and positive remote operation, the center-differential gear shift mean is operated by means of an electric actuator.

One such transfer case with an electric actuator operating the center-differential gear shift means is disclosed in, for example, Japanese Patent Application No. 57-191,166 entitled "Four-wheel Drive Vehicle" filed on Oct. 29, 1982 and laid open as Japanese Patent Unexamined Publication No. 59-81,223 on May 10, 1984.

In the case of the transfer case taught by the above mentioned application provided with means such as free-wheeling means for connecting and disconnecting the transmission of power between the power train and selectively driven wheels, it is unavoidably necessary to couple a power transmission system for the selectively driven wheels to a power train in synchronism with a power transmission system for the regularly driven wheels upon shifting the transfer case into a four-wheel from a two-wheel drive mode of operation. For such a synchronized coupling, the transfer gear shift means is necessarily operated with a strong driving force.

Contrary to this, when shifting the center-differential gear assembly back to the two-wheel drive mode of operation, the differential shift means is operable lightly. For example, a transfer case used in cooperation with the free-wheeling means needs a driving force of, for example, approximately 15 to 20 kg for shifting the center-differential gear assembly into the twowheel from the four-wheel drive mode of operation and of, for example, approximately 80 to 100 kg into the four-wheel from the two-wheel drive mode of operation.

For this reason, the actuator for the differential gear shift means is generally designed to provide a strong driving force acting on a slidable clutch element enough for shifting the center-differential into the four-wheel from the two-wheel drive mode of operation.

One serious problem in association with the transfer case in which a center-differential gear assembly is shifted between the two-wheel and the four-wheel drive mode of operation by means of an electric actuator is an operational shock and noises that occur upon forcing to shift the transfer case, in particular the center-differential gear assembly of the transfer case into the two-wheel and the four-wheel drive mode of operation. This results from the fact that a torsional stress is produced in an interconnection between the driving systems for the front and rear wheels due to the difference of rotational speed.

OBJECT OF THE INVENTION

It is, therefore, an object of the present invention to provide a transfer case operation mode shifting apparatus of a vehicle with four-wheel drive which can effect a transition of the transfer case to a two-wheel drive mode of operation from a four-wheel drive mode of operation only when driving systems for front and rear wheels are freed from an excessive torsional stress while a vehicle is traveling under the four-wheel drive mode of operation.

SUMMARY OF THE INVENTION

The above and other objects of the present invention are accomplished by providing transfer case operation mode shifting apparatus for use on a vehicle equipped with four-wheel drive which comprises center-differential shift means movable between at least two axial positions for shifting a center-differential of the transfer case between at least a four-wheel and a twowheel drive mode of operation and an actuator including an electric motor for moving the differential shift means between the at least two positions, thereby shifting the center-differential between the four-wheel and the two-wheel drive mode of operation. A particular feature of the present invention resides in the cooperation of power transmitting means included in the actuator which is disposed between the electric motor and the center-differential shift means to differentially transmit a driving power of the electric motor to the center-differential shift means so as to actuate the center-differential shift means with different drive forces between the two positions. Specifically when the center-differential is in the four-wheel differential-locked drive mode of operation while the vehicle is traveling, the transmitting means transmits a relatively low power to the center-differential shift means so as not to allow it to move in position. Owing to the transmission of low power, the center-differential is maintained in the four-wheel drive mode of operation when front and rear driving systems for front and rear wheels are subjected to a torsional stress due to the difference of speed produced between front and rear wheels.

As the front and rear wheels become to turn at a substantially same speed of rotation while the vehicle is traveling, such a torsional stress produced between the front and rear driving systems will become slight or disappear. Then, the center-differential shift means is allowed to move with the relative low power acting thereon.

The power transmitting means transmits a relatively high power to the center-differential shift means and forces to move it so as to shift the center-differential from the two-wheel to the four-wheel drive mode of operation while the vehicle is traveling at any speed.

According to a preferred embodiment of the present invention, the power transmitting means includes a rotatable cam member and a cam follower attached to the center-differential shift means. The cam member has a cam groove formed with at least two cam sections inclined at different angles with respect to an axis of rotation of the rotatable cam member. When the cam member is rotated by the electric motor to shift the center-differential into the two-wheel drive mode of operation, the cam follower is engaged with the cam section inclined at an angle larger than that of the other cam section. Since a small axial component force is acted on the cam follower by the large angled cam section, the center-differential shift means is prevented from moving until a torsional stress between the front and rear wheel drive systems becomes sufficiently small.

According to another preferred embodiment of the present invention, the power transmitting means includes power limit means for limiting a driving power to be transmitted from the electric motor to the center-differential shift means lower when shifting the center-differential from the four-wheel to the twowheel drive mode of operation or higher when shifting back the center-differential from the two-wheel to the four-wheel drive mode of operation. The limiting means comprises a drive member connected to the electric motor and a driven member connected to the center-differential shift means through cam means which are operationally coupled by means of a spring. The drive and driven members turn relatively to each other so as to charge the spring with a torsional stress which is detected by either first or second limit switch means to stop the electric motor. The first limit switch is made active when the center-differential is shifted from the four-wheel drive to the two-wheel drive mode of operation so as to detect a relatively low torsional stress of the spring and, on the other hand, the second limit switch is made active when the center-differential is shifted from the two-wheel to the four-wheel drive mode of operation so as to detect a relatively high torsional stress of the spring.

According to still another embodiment of the present invention, the power transmitting means includes a spring disposed between the center-differential shift means and cam means of the actuator driven by the electric motor. The spring is possibly compressed when the center-differential is shifted from the four-wheel to the two-wheel drive mod of operation. Owing to the provision of the spring, the actuator only transmits a low driving power to the center-differential shift means when the center-differential is shifted from the four-wheel to the two-wheel drive mode of operation.

According to yet another embodiment of the present invention, the electric motor of the actuator is associated with a power supply control unit for supplying a low power when the center-differential is shifting from the four-wheel to the two-wheel drive mode of operation and a high power when the center-differential is shift back from the two-wheel to the four-wheel drive mode of operation. The control unit controls the supply of power according to operations of drive mode shift switches disposed in the driver's compartment

BRIEF DESCRIPTION OF THE DRAWINGS

The foregoing and other objects, features and advantages of the present invention will be understood more clearly and fully from the following detailed description of the preferred embodiment with reference to the accompanying drawings wherein similar parts or elements are designated by same reference numerals several drawings and in which:

FIG. 9A is an illustration showing the relative position of drive and gears in a rest position;

FIG. 9B an illustration similar to FIG. 9A but the drive and driven gears are in a 4WL position where the center-differential is shifted from a two-wheel to a four-wheel differential-locked drive mode of operation;

FIG. 9C is an illustration similar to FIG. 9A but the drive and driven gears are in a 4WF position where the center-differential is shifted from the four-wheel differential-locked to a four-wheel drive mode of operation;

FIG. 9D an illustration similar to FIG. 9A but the drive and driven gears are in a 4WL or 2W position where the center-differential is shifted from the four-wheel differential-free or the four-wheel differential-locked to the four-wheel differential-locked or the two-wheel drive mode of operation, respectively;

DETAILED DESCRIPTION OF THE INVENTION

A transfer case and its associated shift means according to a preferred embodiment of the present invention cooperates with various devices and elements, in particular an engine, an engine clutch, a transmission, front and rear axle assemblies and so forth, similar to those of conventional transfer cases. Because such devices and elements are well known to those skilled in the art, this description will be directed in particular to elements forming part of, or cooperating directly with, the transfer case and its associated shift control embodying the present invention. It is to be understood that elements of the transfer case and its associated shift control not specifically shown or described herein may be selected from those known in the art.

Figure 1:
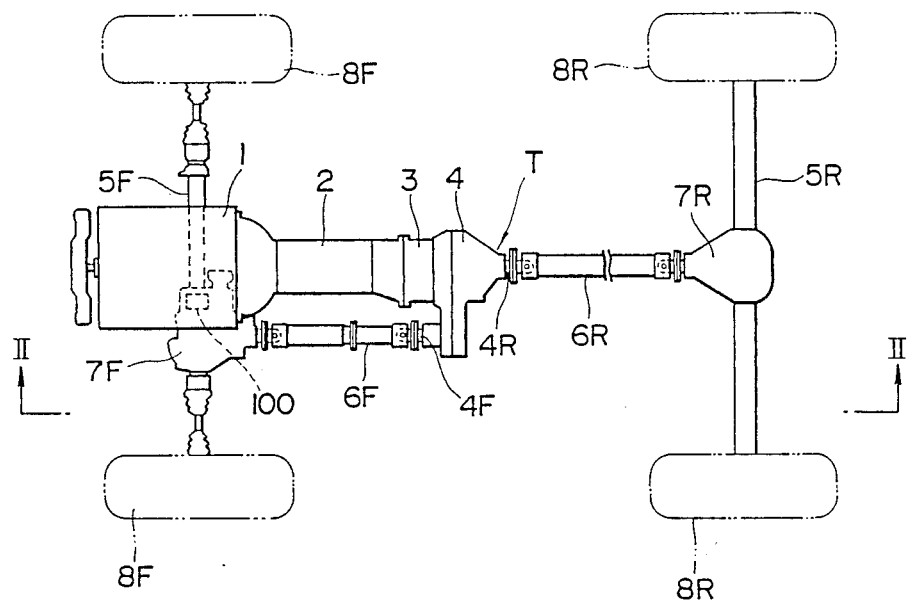
FIG. 1 is a schematic plan view showing a power train for a four-wheel drive vehicle embodying the present invention.
Figure 2:
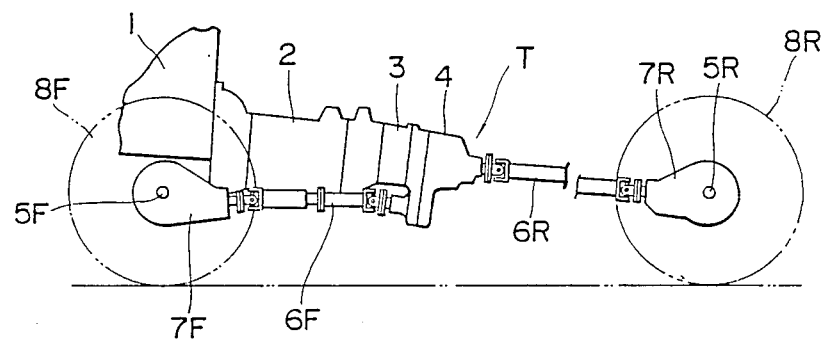
FIG. 2 a schematic elevational view of the power train of FIG. 1.

Referring now to the drawings, wherein like reference characters designate corresponding or similar parts or elements throughout the several views, there is generally schematically shown in FIGS. 1 and 2 a power train of a vehicle equipped with part-time four-wheel drive which has an engine unit 1, a transmission case 2 connected to the engine 1 through an engine clutch (not shown), a transfer case T including a transfer gear assembly 3 and a center-differential gear assembly 4 arranged in order from the front side of the vehicle. A rear wheel drive shaft or rear output shaft 4R of the center-differential gear assembly 4 is coupled to a rear axle shaft 5R through a rear propeller shaft 6R and a rear axle differential case 7R by which a pair of rear wheels 8R are turned differentially. A front wheel drive shaft or front output shaft 4F of the center-differential gear assembly 4, which is laterally spaced from and located in parallel with the rear output shaft 4R, is coupled to a front axle shaft 5F through a front propeller shaft 6F and a front axle differential case 7F by which a pair of front wheels 8F are turned differentially. As is well known to those skilled in the art, each propeller shaft 6R, 6F is coupled at its both ends to the output shaft 4R, 4F and the axle differential case 7R, 7F by means of universal joints.

The front axle 5F is equipped with a free-wheeling means which, when the transfer case T3 is in two-wheel drive mode of operation, disconnects the transmission of power between the front axle differential case 7F and the front wheel 8F. Operation and construction of such free-wheeling mean is well known to those skilled in the art and need not be explained in detail therein.

Figure 3:
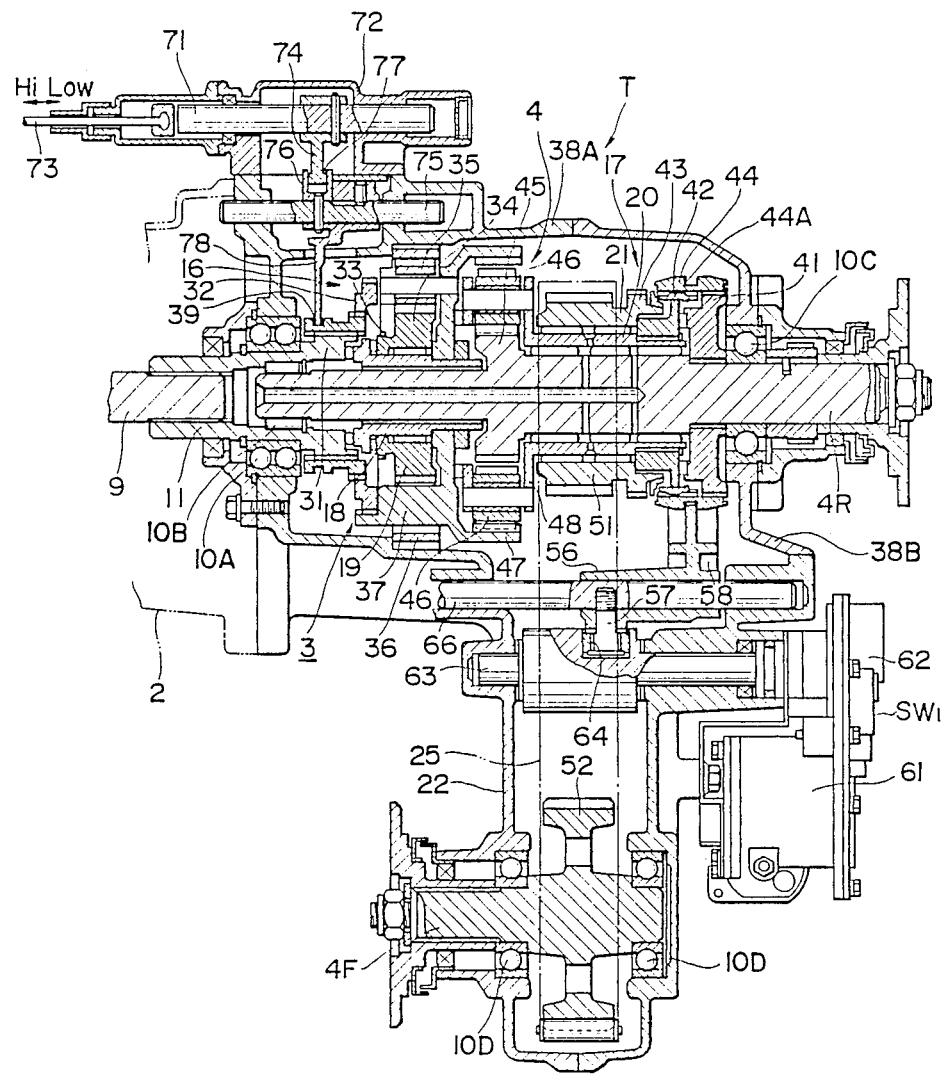
FIG. 3 is a sectional view showing details of the transfer case of the power train of the vehicle equipped with four-wheel drive which is in a two-wheel drive mode of operation.

Referring now to FIG. 3 shown therein in longitudinal section is the transfer case T comprising the transfer gear assembly 3 and center-differential gear assembly 4, each of which basically comprises a planetary gear assembly. As shown, the transfer case T has three rotatable shafts, namely, a transfer input shaft 11 in the form of a hollow tube which is supported by a ball bearing 10A held in a front-half transfer case housing 38A for rotation and is spline-coupled to an output shaft 9 of the transmission assembly 2; the rear output shaft 4R located coaxially relative to the transfer input shaft 11 and supported at its one end by a needle bearing 10B held in the transfer input shaft 11 and at its opposite end by a ball bearing 10C held in a rear-half transfer case housing 38B for rotation; and the front output shaft 4F laterally spaced from and located in parallel with both of the transfer input shaft 11 and the rear output shaft 4R and supported by a pair of ball bearings 10D held in an extension housing 22 formed by portions of the front- and rear-half transfer case housings 38A and 38B. The transfer gear assembly 3 and the center-differential gear assembly 4 which will be described in detail later are mounted on the rear output shaft 4R.

Arranged coaxially with the transfer gear assembly 3 and the center-differential gear assembly 4 are two shift means; namely a transfer gear shift means 16 in cooperation with the transfer gear assembly 3 on the front or left side of the transfer gear assembly 3 and a differential gear shift means 17 in cooperation with the center-differential gear assembly 4 on the front or left side of the center-differential gear assembly 4, as shown in FIG. 3.

The transfer gear assembly 3 which is selectively shiftable into a desired drive range, namely, a low speed drive range or a high speed drive range (which is hereinafter noted by L or H drive mode of operation on descriptive listings), to transmit driving power with or without torque multiplication from the transmission case 2 to the center-differential gear assembly 4, consists of first planetary gear assembly having a ring gear 36 fixed to the front-half transfer housing 38A, a sun gear 34 mounted on the first sleeve shaft 18 spline-coupled to the rear output shaft 4R for rotation, and pinion gears 35 rotatably supported by a carrier member 37 fixed to the first sleeve shaft 18.

On the front side of the transfer gear assembly 3, there is the transfer gear shift means 16 for shifting the transfer gear assembly 3 between two different drive modes of operation, namely the L and H drive modes of operation. This transfer gear shift means 16, which basically takes the form of a sleeve clutch mechanism, consists of first externally-splined clutch ring 31 formed at one end portion of the transfer input shaft 11, second internally-splined clutch ring 32 spline-coupled to the carrier member 37 of the first planetary gear assembly, third externally-splined clutch ring 33 formed on the sun gear 34 of the first planetary gear assembly, and first splined clutch sleeve 39 spline-coupled to the first clutch ring 31 for axial movement. This first clutch ring 31 is axially movable to be selectively brought into spline engagement with the second or the third clutch ring 32 or 33. When the first clutch sleeve 39 is axially displaced and placed in position shown in FIG. 3, the first clutch sleeve 39 engages with the second clutch ring 32 so as to couple the first and second clutch rings 31 and 32 and thereby to lock together the transfer input shaft 11 and the pinion gears 35 of the first planetary gear assembly; the transfer gear assembly 3 is shifted into the H drive range. At this time, the transfer input shaft 11 and the center-differential gear assembly 4 are locked together through the carrier member 37 with which the second clutch ring 32 is integrally formed. This gives direct drive between the transfer input shaft 11 and the center-differential gear assembly 4 through the transfer gear assembly 3.

On the other hand, when the first clutch sleeve 39 is moved axially toward the transfer gear assembly 3 until having disengaged over the second clutch ring 32, the first clutch sleeve 39 is brought into spline-engagement with the third clutch ring 33 so as to couple the first and third clutch rings 31 and 33; the transfer gear assembly 3 is shifted into the L drive mode of operation so as to transmit driving power with a torque multiplication from the transfer input shaft 11 of the transfer gear assembly 3, specifically the sun gear 34 to the ring gear 36 through the pinion gears 35, and hence to the center-differential gear assembly 4 in cooperation with the carrier member 37 of the first planetary gear assembly as the transfer gear assembly 3.

The center-differential gear assembly 4, which can drive both the front and rear axles at the same time but allows them to turn at different speeds as is well known in the art, consists of a second planetary gear assembly that comprises a sun gear 45 formed integrally with a periphery of the middle section of the rear output shaft 4R; a ring gear 47 formed integrally with the rear end portion of the carrier member 37 of the first planetary gear assembly, and pinion gears 46 rotatably attached to carrier member 48 which is integral with third sleeve shaft 20 mounted on the rear output shaft 4R for rotation.

On the rear side of the center-differential gear assembly 4, there is the differential gear shift means 17 which shifts the center-differential gear assembly 4 between differential-free and -locked drive modes of operation or between the two-wheel and four-wheel drive modes of operation. This differential gear shift means 17 consists of fourth externally splined clutch ring 41 spline-coupled to the rear output shaft 4R, fifth externally splined clutch ring 42 spline-coupled to the third sleeve shaft 20, sixth externally splined clutch ring 43 formed integrally with fourth sleeve shaft 21 which is mounted on the third sleeve shaft 20 for rotation, and second clutch sleeve 44. This second clutch sleeve 44, which is spline-coupled to the fifth clutch gear 42, is axially movable to selectively engage with the fourth clutch ring 41 or the sixth clutch ring 43 so as to shift the center-differential gear assembly 4 into a desired drive mode of operation. The fourth sleeve shaft 21 is integrally formed with a driving sprocket wheel 51 which is connected to a driven sprocket wheel 52 formed integrally with the front output shaft 4F by means of a chain 25 (shown by a dotted line in FIG. 3).

This differential gear shift means 17 can shift the center-differential gear assembly 4 into any one of three different drive modes of operation, namely, two-wheel (2W) drive mode of operation, four-wheel differential-free (4WF) drive mode of operation, and four-wheel differential-locked (4WL) drive mode of operation.

Figure 4A:
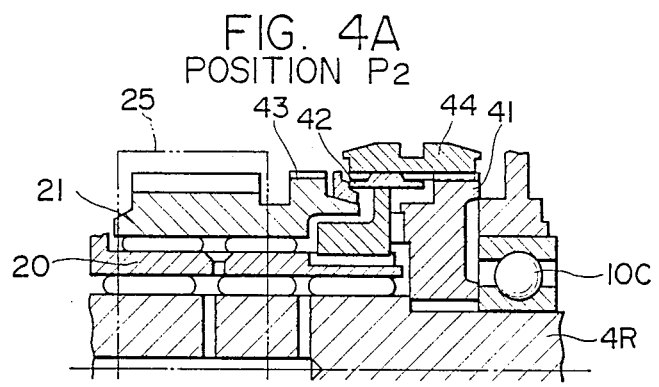
FIGS. 4A. to 4C are sectional views showing details of a center-differential shift means of the transfer case of FIG. 3 which are in the two-wheel drive mode of operation, a four-wheel differential-locked drive mode of operation and a four-wheel differential-free drive mode of operation, respectively.

When the differential gear shift means 17 is ready for the two-wheel drive mode of operation as is shown in FIG. 3 and in more detail in FIG. 4A, the second clutch sleeve 44 is in engagement with the fourth and fifth clutch rings 41 and 42 and, on the other hand, in disengagement over the sixth clutch ring 43. Under this two-wheel drive mode of operation, the sun gear 45 and the pinion gears 46 of the second planetary gear assembly are locked together, transmitting driving torque from the ring gear 47 of the second planetary gear assembly directly to the rear output shaft 4R.

Figure 4B:
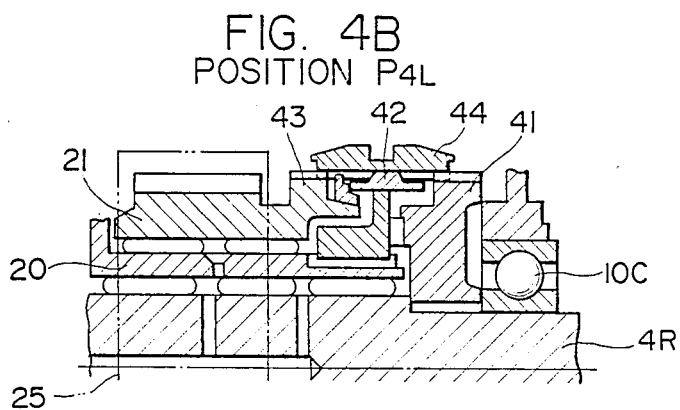
Figure 4C:
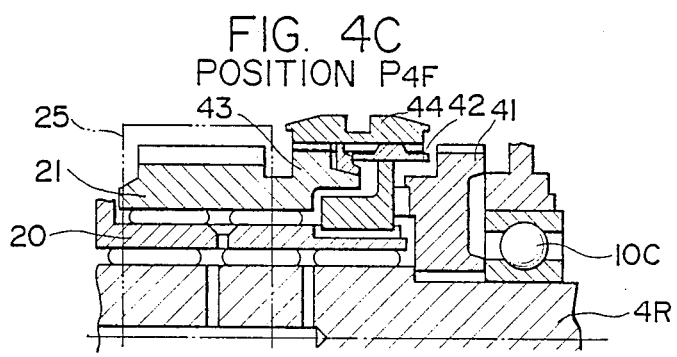

When the differential gear shift means 17 is ready for four-wheel differential-free drive mode of operation as is shown in FIG. 4C, the second clutch sleeve 44 is brought into spline engagement with the fifth and sixth clutch rings 42 and 43 but out of engagement over the fourth clutch ring 41. Therefore, the third and fourth sleeve shafts 20 and 21 are locked together through the fifth and sixth clutch rings 42 and 43 to shift the center-differential gear assembly 4 into the four-wheel differential-free drive mode of operation. As a result, the center-differential gear assembly 4 allows the front and rear output shafts 4F and 4R to turn at different speeds when negotiating a turn.

When the differential gear shift means 17 is ready for the four-wheel differential-locked drive mode of operation as is shown in FIG. 4B, the second clutch sleeve 44 is placed in engagement with all the three clutch rings, namely the fourth, fifth and sixth clutch rings 41, 42 and 43. Under this four-wheel differential-locked drive mode of operation, the third and fourth sleeve shafts 20 and 21 are locked together to maintain the center-differential gear assembly 4 in the four-wheel drive mode of operation. Simultaneously, since the rear output shaft 4R and the third sleeve shaft 20 are locked together, the center-differential gear assembly 4 is shifted into the four-wheel differential-locked drive mode of operation. As a result, although the center-differential gear assembly 4 drives the front and rear output shafts 4F and 4R at the same time but prevents them from turning at different speeds.

As can be understood from the above description, since the fourth clutch ring 41 is spline-coupled to the rear output shaft 4R with which the sun gear 45 of the center-differential gear assembly 4 is integrally formed and the sixth clutch ring 42 is spline-coupled to the third sleeve shaft 20 to which the pinion gears 46 of the second planetary gear assembly are fixed by the integrally formed carrier member 48, the fourth and fifth clutch rings 41 and 42 are allowed to make a relative turn slightly either in the opposite directions or the same direction with respect to each other by the aid of a back lash given between the sun gear 45 and the pinion gears 46 of the second planetary gear assembly. Due to this relative turn between the fourth and fifth clutch rings 41 and 42, the second clutch sleeve 44 can be smoothly and easily brought into spline engagement with the fourth clutch gear 41 so as to couple together the sun gear 45 and the pinion gears 46 of the second planetary gear assembly serving as the center-differential gear assembly 4.

On the other hand, since the fourth sleeve shaft 21 having the sixth clutch ring 43 formed integrally therewith is mounted for rotation on the third sleeve shaft 20 having the fifth clutch ring 42, the fifth and sixth clutch rings 42 and 43 are also allowed to turn relative to each other by the aid of a rotational play produced between the third and fourth sleeve shafts 20 and 21. Due to this relative turn between the third and fourth sleeve shaft 20 and 21, the second clutch sleeve 44 can be easily and smoothly brought into spline engagement with the sixth clutch ring 43 and, simultaneously, brought out of engagement with the fourth clutch ring 41, so as to couple together the pinion gears 46 of the second planetary gear assembly as an output member of the center-differential gear assembly 4 and the driving sprocket wheel 51, and hence the front output shaft 4F through the driven sprocket wheel 52.

Figure 5:
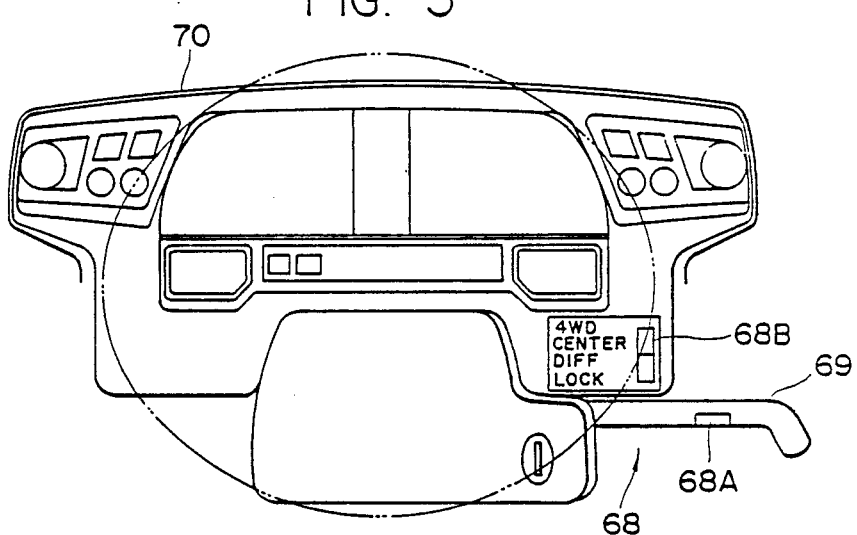
FIG. 5 is a schematic illustration showing the transfer case operating means arranged in a driver's compartment of a vehicle.

Referring to FIG. 5, for effecting the above-described drive mode shifting of the transfer gear assembly 3 and the center-differential gear assembly 4 of the transfer case T, there may be a transfer shift means 68 comprising a manual shift lever 69, a 2W-4W shift switch 68A and a DF-DL shift switch 68B. The manual shift lever 69 is in the form of a column shift lever. This manual shift lever 69 is provided on a steering column (not shown) for mounting a steering wheel ST and is operated between two operating positions, namely L drive mode selecting position and a H drive mode selecting position. The manual shift lever 69 is operationally connected to the transfer case T. In more detail, this manual shift lever 69 is operationally connected to a shift control rod 71 which is supported within an extension 72 of the front-half transfer case housing 38A for axial movement through a push-pull type connecting cable 73, as is shown in FIG. 3. Fixedly mounted on the shift control rod 71 is a connecting pin extending downwardly. Switch 68B is mounted on instrument panel 70.

Referring again to FIG. 3, disposed in juxtaposition with the shift control rod 71 is a supporting rod 75 supported in the extension 72 of the front-half transfer case housing 38A for axial movement. The supporting rod 75 carries an annular sleeve member 76 formed with a peripheral groove 77 which is engaged by a connecting pin 74 of the shift control rod 71 and which has a shift fork 78 extending radially downwardly. As seen in FIG. 3, the shift fork 78 of the annular sleeve member 76 is in circumferential slidable engagement with an annular groove 39A formed in the periphery of the first clutch sleeve 39 of the first or transfer gear shift means 16.

When the manual shift lever 69 in the driver's compartment is operated and placed in the H drive mode selecting position, the shift control rod 71 is displaced axially to move the first clutch sleeve 39 of the transfer gear shift means 16 in position (shown in FIG. 3), coupling together the first and second clutch rings 31 and 32, namely the transfer input shaft 11 and the carrier member 32 of the first planetary gear assembly, thereby shifting the transfer gear assembly 3 into the high speed range or H drive mode of operation.

On the other hand, when the manual shift lever 69 in the driver's compartment is operated or reversed to select the L drive mode selecting position, the shift control rod 71 is displaced axially rearwardly to move the first clutch sleeve 39 of the transfer gear shift means 16 rearwardly in position so as to disengage the first clutch ring 31 over the second clutch ring 32 and to bring the first clutch ring 31 and the third clutch ring 33 into spline-engagement, thereby coupling together the transfer input shaft 11 and the sun gear 34 of the first planetary gear assembly to shift the transfer gear assembly 3 into the low speed range or L drive mode of operation.

Figure 6:
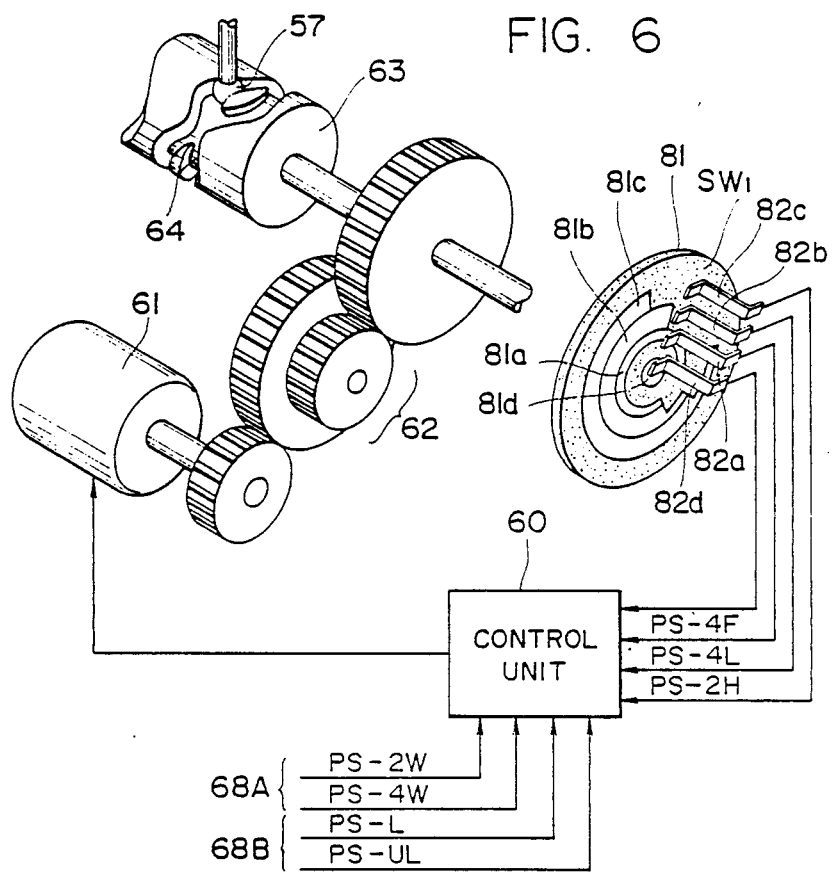
FIG. 6 is a schematic perspective view of an actuator for a center-differential of the transfer case of FIG. 3.

For shifting the center-differential gear assembly 4 between different drive modes of operation by means of the second or differential gear shift means 17, there is provided a control unit 60 (see FIG. 6) for controlling a reversible electric motor 61 associated with a reduction gear 62 which cooperates with a shift control rod 63 supported by the rear-half transfer case housing 38B for rotation and having a cam groove 64 formed on its outer periphery thereof. Placed in juxtaposition with the shift control rod 63 is a guide rod 66 on which a sleeve member 56 is fixedly attached. The sleeve member 56 is provided with a connecting pin or cam follower 57 by which the cam groove 64 of the shift control rod 63 is slidably engaged and' a fork member 58, the cam follower 57 and fork member 58 being axially spaced from and extending radially oppositely to each other. The fork member 58 is in circumferential slidable engagement with an annular groove 44A formed on a periphery of the second clutch sleeve 44 of the second or differential gear shift means 17.

Shown by SW1 in FIG. 3 is a drive mode sensor provided to detect angular positions of the shift control rod 63. As is shown in detail in FIG. 6, the drive mode sensor SW1 comprises a printed contact disc 81 having arcuate electric contacts 81a to 81d printed thereon and fixed electric contacts 82a to 82d provided one individual to each arcuate printed contact to provide mode signals corresponding to selected drive modes. The contacts 81d and 82d are used as common contacts for the other three. Specifically, when the drive motor 61 is rotated to turn the shift control rod 63 through an angle necessary to axially displace the guide rod 66 so as to place the shift sleeve member 44 of the differential gear shift means 17 to the position $P_2$ in order to shift the center-differential gear assembly 4 into the two-wheel drive mode of operation, the printed contact 81c of the contact disc 81 is brought into contact with the fixed contact 82c to provide a mode signal PS-2H. In a same way, the drive motor 61 is rotated to turn the control rod 63 so as to place the shift sleeve member 44 to the position $P_{4L}$ in order to shift the center-differential gear assembly 4 into the four-wheel differential-locked drive mode of operation, the printed contact 81b of the contact disc 81 is brought into contact with the fixed contact 82b to provide a mode signal PS-4L, and so as to place the shift control sleeve member 44 to the position $P_{4F}$ in order to shift the center-differential gear assembly 4 into the four-wheel differential-free drive mode of operation, the printed contact 81a of the contact disc 81 is brought into contact with the fixed contact 82a to provide a mode signal PS-4F. These position signals are sent to the controller 60. When the controller 60 receives any mode signal, it stops the drive motor 61.

For effecting the above-described drive mode transition or shifting of the center-differential gear assembly 4, the transfer shift means 68, as is shown in FIG. 5, comprises the 2W-4W shift switch 68A disposed on the column shift lever 69 and a DF-DL shift switch 68B disposed in instrument panel 70 in the driver's compartment.

The 2W-4W shift switch 68A of the transfer case shift means 68 which may take the form of a slidable dip-switch is always urged to a given position and is adapted to provide the controller 60 with a shift signal PS-4W when it is firstly operated fully to the left or a four-wheel drive mode selecting position and with a shift-back signal PS-2W when it is again operated to the four-wheel drive mode selecting position. When the shift signal PS-4W is provided, the controller 60 causes the electric motor 61 to rotate in one direction, turning the shift control rod 63 through the reduction gear 62 in order to axially displace the guide rod 66 with the sleeve member 56 fixed thereto through the sliding engagement between the cam follower 57 and the cam groove 64, thereby axially displacing the second clutch sleeve 44 of the differential gear shift means 17. As a result, the second clutch sleeve 44 spline-coupled to the fifth clutch ring 42 is axially displaced to be selectively brought into spline engagement with the sixth clutch ring 43 of the fourth hollow sleeve shaft 21 (see FIG. 4B) so as to shift the center-differential gear assembly 4 into the four-wheel drive mode of operation. On the other hand, when the shift-back signal PS-2W is provided, the controller 60 causes the motor 61 to rotate in the reversed or opposite direction, displacing the second clutch sleeve 44 of the differential gear shift means 17 to the position $P_2$ (FIG. 4A) so as to shift back the center-differential gear assembly 4 into the four-wheel drive mode of operation.

The DF-DL shift switch 68B, which may take the form of a push-in-push-back type switch adapted to be held pushed-in until being pushed again, provides the controller 60 with a lock signal PS-L for the push-in operation thereof and with an unlock signal PS-UL for the push-back operation thereof. When the lock signal PS-L is provided, the controller 60 causes the motor 61 to rotate so as to displace and couple the second clutch sleeve 44 to both the fifth and sixth clutch rings 41 and 43, thereby to shift the center-differential gear assembly 4 into the differential-locked drive mode of operation. On the other hand, when the unlock signal PS-UL is provided, the controller 60 causes the motor 61 to reverse in rotation so as to return and couple the clutch sleeve 44 to the sixth clutch ring 43, thereby to shift back the center-differential gear assembly 4 in the differential-free drive mode of operation.

By various combined operations of these shift lever 69, 2W-4W shift switch 68A and DF-DL shift switch 68B of the transfer shift means 68, the transfer case T is shifted. Specifically, when the manual shift lever 69 is operated to displace the first clutch sleeve 39 of the transfer gear shift means 16 to a H drive mode of operation selecting position through the shift control rod 71, the transfer gear assembly 3 is shifted in the H drive mode of operation. As a result, the transfer case T becomes ready for being selectively shifted between the two-wheel H and four-wheel differential-free H drive mode of operations by the operation of the 2W-4W shift switch 68A; between the four-wheel differential-free H ; and the four-wheel differential-locked H; or from the two-wheel H to the four-wheel differential-locked H drive mode of operation by the operation of the DF-DL shift switch 68B.

Figure 7:
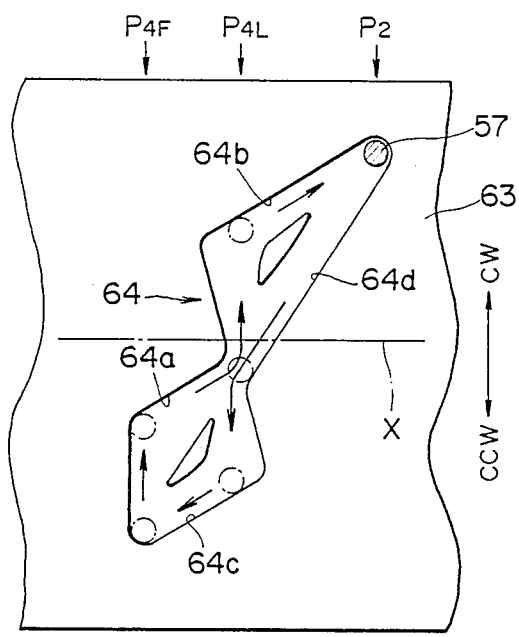
FIG. 7 an expanded and developed view illustrating a cam profile.

As is shown in detail in FIG. 7, the cam groove 64 formed on the periphery of the shift control rod 63 is so shaped that an operating torque required to turn the shift control rod 63 is smaller when shifting the center-differential gear assembly 4 into the two-wheel drive mode of operation from the four-wheel drive mode of operation than into the four-wheel drive mode of operation from the two-wheel drive mode of operation. In more detail, the cam groove 64 comprises four active cam surfaces 64a-64d which are discontinuously connected in a closed cam surface. The active cam surfaces 64a to 64c are substantially in parallel with one another and inclined at an angle with respect to the axis (X) of rotation of the shift control rod 63 smaller than an angle at which the cam surface 64d is inclined with respect to the axis of rotation of the shift control rod 63. When the shift control rod 63 turns in the clockwise direction (shown by "CW"), the cam follower 57 is forced to move axially from the position $P_{4F}$ to the position $P_{4L}$ by the active cam surface 64a and from the position $P_{4L}$ to the position $P_2$ by the cam surface 64b when the shift control rod 63 turns in the counterclockwise direction (shown by "CCW"), and to move back from the position $P_2$ to the position $P_{4L}$ by the cam surface 64c and from the position $P_{4L}$ to the position $P_{4F}$ by the cam surface 64d when the shift control rod 63 turns in the opposite or clockwise direction.

Because of the angle of inclination of the parallel cam surfaces 64a to 64c with respect to the axis (X) of rotation of the shift control rod 63 smaller than that of the cam surface 64d, an axial component of force acting on the cam follower 57 created by each of the parallel cam surfaces 64a to 64c is smaller than that by the cam surface 64d. According to the preferred embodiment, the cam groove is designed to provide the axial component force of, for example, approximately 20 kg for the parallel cam surfaces 64a to 64c and approximately 100 kg for the cam surface 64d. However, it is to be understood that the actual value of the axial component force is depends on designs of center-differential shift means with their associated mechanisms.

According to the center-differential shift control means, the center-differential gear assembly 4 is shifted as follows. It is assumed that the center-differential gear assembly 4 is in the two-wheel drive mode of operation and, therefore, the differential gear shift means 17 is in the position $P_2$ shown in FIGS. 3 and 4A. When the 2W-4W shift switch 68A in the driver's compartment is operated with an intention of shifting the center-differential gear assembly 4 into the four-wheel differential-locked (4WL) drive mode of operation, a shift signal PS-4W is applied to the control unit 60 so as to cause the electric motor 61 to turn, rotating the shift control rod 63 in the clockwise direction. Consequently, the cam follower 57 is forced by the cam groove 64, in particular by the cam surface 64d, with an axial component force of approximately 100 kg to move axially, axially displacing and bringing the second clutch sleeve 44 into spline engagement with the sixth clutch ring 43 while keeping a spline-engagement with the fifth clutch ring 41 so as to shift the center-differential gear assembly 4 into the four-wheel differential-locked drive mode of operation (4WL). Upon the drive mode sensor SW1 detects the completion of shifting the center-differential gear assembly 4 into the four-wheel differential-locked drive mode of operation (4WL), it provides the control unit 60 with a mode signal PS-4F. Under the presence of the mode signal PS-4F, the control unit 60 controls the electric motor 61 to stop its rotation.

When the 2W-4W shift switch 68A is pushed again, the control unit 60 receives a shift-back signal PS-2H to cause the electric motor 61 to turn in the counterclockwise direction. As a result, the cam surface 64b forces the cam follower 57 with an axial component force of approximately 20 kg.

On the other hand, when the DF-DL shift switch 68B is operated after the first operation of the 2W-4W shift switch 68A, the control unit 60 receives an unlock signal PS-UL, so as to control the electric motor 61 to turn in the clockwise direction. Consequently, the cam surface 64c forces the cam follower 57 with an axial component force of approximately 20 kg.

If the center-differential gear assembly 4 is in the four-wheel differential-free drive mode of operation (4W-DF), the differential shift means 17 is positioned in the position $P_{4F}$ shown in FIG. 4C and, therefore, the cam follower 57 is placed at a position shown by a broken circle in FIG. 7. At this state, when the DF-DL shift switch 68B is operated, the control unit 60 receives a lock-signal PS-L, so as to control the electric motor 61 to turn in the counterclockwise direction. Therefore, the cam surface 64a forces the cam follower 57 with an axial component force of approximately 20 kg.

After the first operation of the DF-DL shift switch 68B, if the DF-DL shift switch is operated again, the control unit 60 provides an unlock-signal PS-UL, so as to control the electric motor 61 to turn in the clockwise direction. Consequently, the cam surface 64c forces the cam follower 57 with an axial component force of approximately 20 kg. On the other hand, after the first operation of the DF-DL shift switch 68B, if the 2W-4W shift switch is operated, the control unit 60 receives a shift-back signal PS-2W, so as to controls the electric motor 61 in the counterclockwise direction. The cam surface 64b forces the cam follower 57 with an axial component force of approximately 20 kg.

In any case of the cam surface 64a, 64b, 64c forcing the cam follower 57, the cam follower 57 is not always axially displaced because the axial component force is relatively small. If there is a torsional stress produced between the driving systems for the front and rear wheels due to the difference of rotational speed, the axial component force acting on the cam follower 57 from any of the cam surfaces 64a, 64b and 64c, which is approximately 20 kg, is too small to axially displace the cam follower 57 and, therefore, no displacement of the differential gear shift means 17 is caused, leaving the center-differential gear assembly 4 in a present drive mode of operation.

With the reduction of the difference of rotational speed between the driving systems for the front and rear wheels, the torsional stress becomes small enough to allow the cam follower 57 to be axially displaced with a force of approximately 15 to 20 kg. Then, the shift control rod 63 is turned by the electric motor 61 so as to displace the cam follower 57 with the cam groove 64, in particular with the cam surface 64a, 64b or 64c.

Figure 8A:
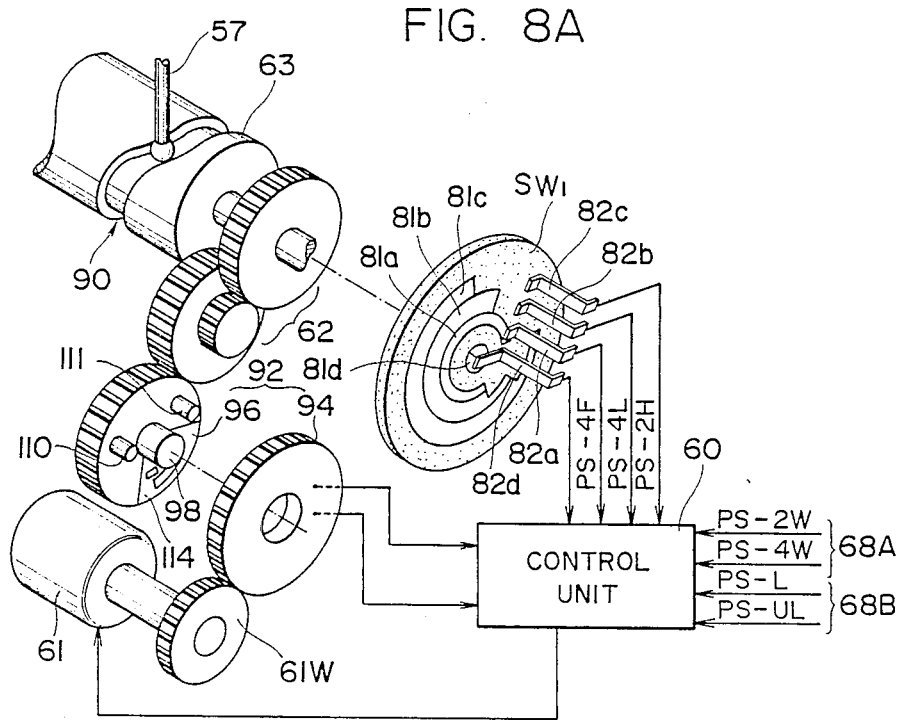
FIG. 8A a schematic perspective view of another embodiment of an actuator for the center-differential of the transfer case of FIG. 3.
Figure 8B:
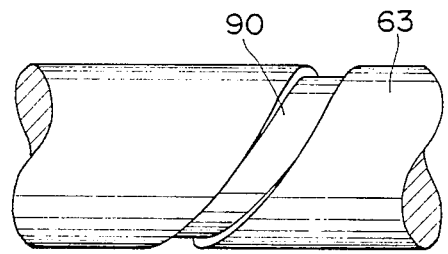
FIG. 8B is a partial side view of a shift control rod of the actuator of FIG. 8A.

Referring to FIGS. 8A to 9D, there is shown the differential gear shift means 17 according to another preferred embodiment of the present invention in which a mechanical torque limiter is used. As shown in FIG. 8A, the shift control rod 63 formed with a substantially linear cam groove 90 is coupled to the electric motor 61 through the reduction gear train 62 and a mechanical torque limiter 92. The mechanical torque limiter 92 comprises a drive gear 94 in mesh with a worm gear 61W of the electric motor 61 and a driven gear 96 coupled to the shift control rod 63 through a reduction gear 62 in the form of a gear train. It is to be noted that the drive and driven gears 94 and 96 are generally made of electrically non-conductive materials. The mode sensor SW1 is connected to the shift control rod 63 to provide mode signals which are received by the control unit 60.

Figure 8C:
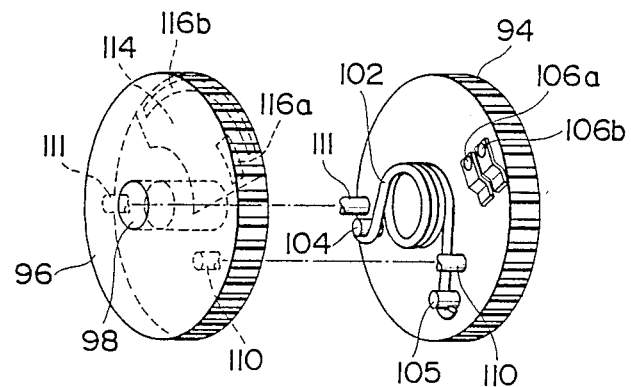
FIG. 8C an exploded perspective of limiting means of the actuator of FIG. 8A.

The drive gear 94 mounted for rotation on a shaft 98 fixed to the driven gear 96 is provided with a torsion coil spring 102 mounted on the shaft 98 and held by a pair of studs 104 and 105 attached to the drive gear 94, FIG. 8C. The drive gear 94 is further provided with first and second electrical contacts 106a and 106b which are in contact with the surface of the driven gear 96 and connected to the control unit 60. On the surface of the driven gear 96 facing to the drive gear 94, there are provided a pair of studs 110 and 111 which are brought into contact with the torsion coil spring 102 when the drive gear 94 turns in the opposite directions and is formed with an electrically conductive area 114 (which is shaded in FIG. 9B) in the form of a sector covering the extremities of movement of the first and second electric contacts 106a and 106b. The conductive sector area 114 is formed with first and second electrically non-conductive segments 116a and 116b in arcuate form. It is to be noted that the first non-conductive segment 116a is shorter than the second 116b. The first and second contacts 106a and 106b and the first and second non-conductive segments 116a and 116b form first and second limit switches 120a and 120b, respectively.

When the drive and driven gear 94 and 96 are in their rest position, the first and second limit switches 120a and 120b are positioned as shown in FIG. 9C. These limit switches 120a and 120b are adapted to provide the control unit 60 with a motor stop signal upon being brought into contact with the conductive area 114. When drive gear 94 turns in the clockwise direction as viewed in FIGS. 9A and 9C, the torsion coil spring 102 is pressed at one end by the stud 105 of the drive gear 94 and restricted at the other end by the stud 111 of the driven gear 96, being compressed to charge increasingly a torsional stress therein. The torsion coil spring 102 is so designed as to charge a torsional stress substantially equal to an axial component force acting on the cam follower of approximately 20 kg when the drive gear 94 turns until the first contact 106a is displaced out of the first non-conductive segment 116a or brought into contact with the conductive area 114 or of approximately 100 kg when the drive gear turns until the second contact 106b is displaced out of the second non-conductive segment 116b or brought into contact with the conductive area 114.

For shifting the transfer case equipped with the mechanical torque limiter of this embodiment, the 2W-4W shift switch 68A and the DF-DL shift switch 68B shown in FIG. 5 are operated. When the 2W-4W shift switch 68A is operated to select the four-wheel drive mode of operation, namely to shift the center-differential gear assembly 4 into the four-wheel differential-locked from the two-wheel differential-locked drive mode of operation, the control unit 60 makes the second limit switch 120b active, simultaneously with causing the electric motor 61 to turn so as to turn the drive gear 94 in the counterclockwise direction. As a result of the counterclockwise turn of the drive gear 94, the torsion coil spring 102 is compressed and torsionally distorted by the stud 105 of the drive gear 94 and the stud 111 of the driven gear 96 to charge a gradually increasing torsional stress. When the torsion coil spring 102 charges a torsional stress enough to axially move the cam follower 57, the driven gear 96 turns following the drive gear 94 so as to rotate the shift control rod 63, thereby to axially displace the cam follower 57 through the cam groove 90. Consequently, the second clutch sleeve 44 is brought into engagement with the sixth clutch ring 43 while being kept in engagement with the fourth and fifth clutch rings 41 and 42. Thus, the center-differential gear assembly 4 is shifted into the four-wheel differential-locked drive mode of operation.

At the moment the shift control rod 63 turns enough to axially displace the cam follower 57 for bringing the second clutch sleeve 44 into engagement with the sixth clutch ring 43, the mode sensor SW1 provides the control unit 60 with a mode signal PS-4L. Therefore, the control unit 60 controls the electric motor 61 to stop its rotation to allow the torsion coil spring 102 to release its charged stress so as to return the drive gear 94 in the clockwise direction.

On the other hand, if the cam follower 57 needs an axial component force a little bit larger than approximately 100 kg to be axially displaced, the electric motor 61 is controlled to stop its rotation by the control unit 60 when the second limit switch 120b is turned on. Consequently, the torsion coil spring 102 is allowed to release its charged torsional stress, so that the drive gear 94 is returned to its rest position to bring the second limit switch 120b turned off. As a result, the control unit 60 causes the motor 61 to turn in the counterclockwise direction with charging the torsion coil spring 102. This action is repeated until the cam follower 57 is axially displaced with an axial component force not larger than approximately 100 kg.

In the case that the DF-DL shift switch 68B is operated to select the four-wheel differential-free drive mode of operation, namely to shift the center-differential gear assembly 4 into the four-wheel differential-free from the four-wheel differential-locked drive mode of operation, the control unit 60 makes the first limit switch 120a active, simultaneously with causing the electric motor 61 to turn so as to turn the drive gear in the counterclockwise direction. Consequently, the torsion coil spring 102 is compressed and torsionally distorted by the stud 105 of the drive gear 94 and the stud 111 of the driven gear 96. Because the cam follower 57 needs an axial component force larger than approximately 20 kg to be axially displaced when a torsional stress is produced between the driving systems for the front and rear wheels due to the difference of rotational speed, the driven gear 96 is not caused to turn by the charged torsional coil spring 102. At the moment the drive gear 94 turns enough to turn on the first limit switch 120a, the control unit 60 controls the electric motor 61 to stop, allowing the torsion coil spring 102 to release its charged torsional stress so as to return the drive gear 94 to its rest position. Then, the first limit switch 120a is turned off, the control unit 60 controls the electric motor 61 to start again. This action is repeated until a torsional stress produced between the driving systems becomes smaller with the decrease of the difference of rotational speed between the front and rear wheels.

When a torsional stress between the driving systems for the front and rear wheels becomes sufficiently small, the driven gear 96 can turn following the drive gear 94 to rotate the shift control rod 63, so that the cam groove 90 forces the cam follower 57 to axially displace it with an axial component force equal to or a little smaller than approximately 20 kg. In such away, the second clutch sleeve 44 is brought into disengagement with the fourth clutch ring 41 but into engagement with the sixth clutch ring 43 as is shown in FIG. 4C so as to shift the center-differential gear assembly 4 into the four-wheel differential-free drive mode of operation. As is apparent from the previous description, at the moment the center-differential gear assembly 4 is fully shifted into the four-wheel differential-free drive mode of operation, the mode sensor W1 provides with the control unit 60 with a mode signal PS-DF. Under the presence of the mode signal PS-DF, the control unit 60 controls the electric motor 61 to stop its rotation, completing the shift operation of the transfer case T from the four-wheel differential-locked to the four-wheel differential-free drive mode of operation. The torsion coil spring 102 discharges its torsional stress, returning the drive gear 94 to its original position shown in FIG. 9C.

Upon operating the DL-DF switch 68B while the center-differential gear assembly 4 is in the four-wheel differential-free drive mode of operation, the control unit 60 receives a shift signals PS-1, and selects and causes the first limit switch 120a active simultaneously with actuating the electric motor 61 to turn in the clockwise direction, compressing the torsion coil spring 102 by the stud 104 of the drive gear 94 and the stud 110 of the driven gear 96 to charge a torsion stress. At the moment the first contact 106a is brought into contact with the conductive area 114 of the driven gear 94, the first limit switch 120a turns on to provides the control unit 60 with a stop signal. If a torsional stress produced between the driving systems for the front and rear wheels is larger than approximately 20 kg, the control unit 60 controls the electric motor 61 to stop. Consequently, the drive gear 94 is allowed to turn back by the aid of the charged torsion coil spring 102 to its original position. At the original position, the first limit switch 120a is turned off again. As a result, the electric motor 61 turns again in the clockwise direction, charging the torsion coil spring 102. This action is repeated until the torsional stress between the front and rear driving systems becomes sufficiently smaller than approximately 20 kg.

As apparent, if in fact the torsional stress between the front and rear driving systems is sufficiently small to allow the cam follower 57 to be axially displaced with an axial component force exerted by the cam groove 90 of the shift control rod 63, the driven gear 96 follows the drive gear 94 to turn the shift control rod 63 without charging the torsion coil spring 102, axially displacing back the cam follower 57 by the aid of the cam groove 90 to bring the second clutch sleeve 44 into engagement with the fourth clutch ring 41 while leaving the same in engagement with the sixth clutch ring 43 so as to shift back the center-differential gear assembly 4 into the four-wheel differential-locked drive mode of operation. When the completion of transition of the center-differential gear assembly 4 into the four-wheel differential-locked drive mode of operation, the mode sensor W1 provides the control unit 60 with a mode signal PS-L. Then, the control unit 60 controls the electric motor 61 to stop, finishing the shifting action of the center-differential gear assembly 4.

Figure 10A:
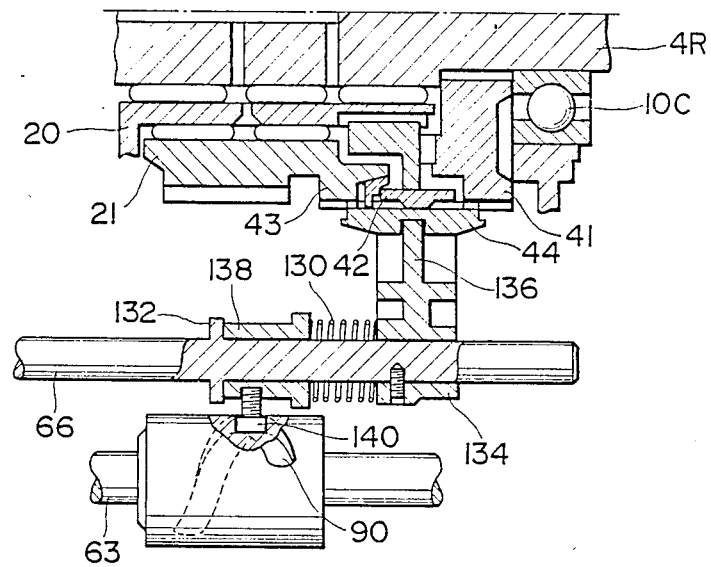
FIG. 10A is a sectional view showing partially the center-differential shift means in association with an actuator according to a still another embodiment of the present invention in which the center-differential is in a four-wheel differential mode of operation.
Figure 10B:
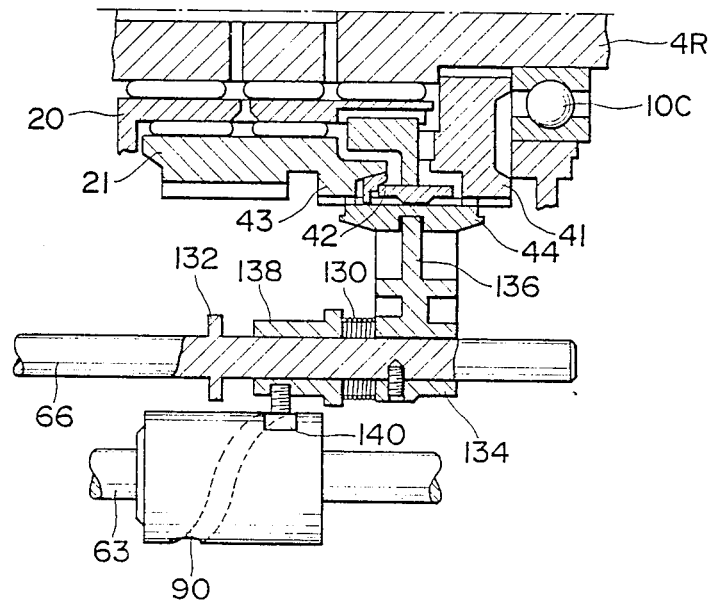
FIG. 10B is a sectional view, similar to FIG. 10A, in which the actuator is actuated while leaving the center-differential in the same drive mode of operation.

Referring to FIGS. 10A and 10B, there is shown the transfer case according to still another preferred embodiment of the present invention which is featured by the provision of differential driving power transmitting means having a coil spring 130 deformable under the application of axial compressive load larger than approximately 20 kg. In more detail, the guide rod 66 is provided with an annular collar 132 integrally formed therewith or fixed thereto and a sleeve member 134 fixed thereto and provided with a fork member 136 similar to the fork member 58 in FIG. 3. Between the annular collar 132 and the sleeve member 134, there is provided a sleeve member 138 slidably mounted on the guide rod 66 and provided with a connecting pin or cam follower 140 in engagement with the cam groove 90 of the shift control rod 63. The coil spring 130 is dispose between the slidable sleeve member 138 and the fixed sleeve member 134.

According to the differential driving power transmitting means thus constructed, when it is desired to shift the center-differential gear assembly 4 from the four-wheel differential-locked to the two-wheel drive mode of operation, the 2W-4W switch (shown in FIG. 5) is operated to provide the control unit 60 with a shift signal PS-2W. As a result, the electric motor 61 is turned to rotate the shift control rod 66, so as to slidably move the sleeve member 138. If the driving systems for the front and rear wheels 8F and 8R is subjected to a torsional stress due to the difference of speeds if rotation between the front and rear wheels and need an axial force larger than approximately 20 kg in order to disengage the second clutch sleeve 44 from the sixth clutch ring 43, the coil spring 130 is compressed, so that the sleeve member 138 slides relative to the shift control rod 66 without pushing the fixed sleeve member 134, leaving the differential gear shift means 17 in the position $P_{4L}$. When the difference of speeds of rotation between the front and rear wheels 8F and 8R becomes sufficiently small while the vehicle is traveling, the front and rear wheel driving systems allow the second sleeve clutch 44 to be brought into disengagement with the sixth clutch ring 43 with ax axial force smaller than approximately 20 kg. Consequently, the coil spring 130, which is compressed, is released to expand so as to displace the fixed sleeve member 134, and hence the guide rod 66, bringing the second sleeve clutch 44 into disengagement with the sixth clutch ring 43 so as to shift the center-differential gear assembly 4 into the two-wheel drive mode of operation. It is apparent, however, that, if the front and rear wheels driving systems is not subjected to any torsional stress or subjected to a slight torsional stress, the fixed sleeve member 134, and hence the guide rod 66, is axially displaced through the coil spring 130 which is not compressed as the shift control rod 63 is turned.

In the case of shifting the center-differential gear assembly 4 from the four-wheel differential-locked to the four-wheel differential-free drive mode of operation, the sleeve member 138 pushes directly the collar 132 to axially displace the guide rod 66.

Figure 11:
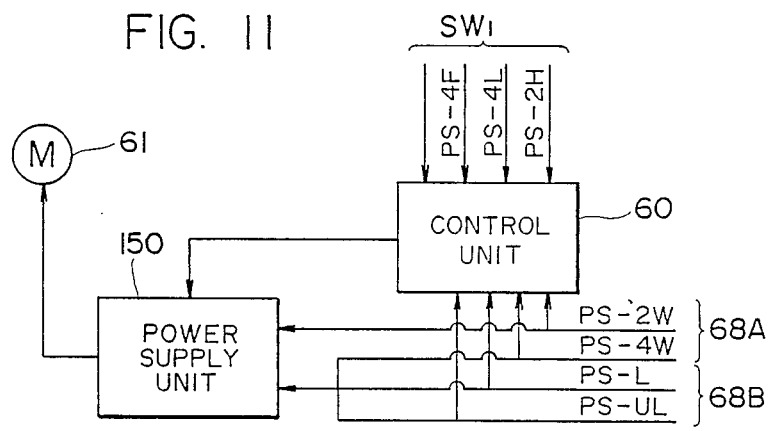
FIG. 11 block diagram showing a further embodiment of the actuator according to the present invention which includes a power supply control unit for the electric motor.

FIG. 11 shows a further embodiment of the present invention. A particular feature of this embodiment resides in the corporation of a differential power controller 150 for supplying an electric power to the electric motor 61 in two ways. In more detail, the differential power controller 150 is so adapted as to supply a low power when a shift signal PS-2W is provided to shift the center-differential gear assembly 4 into the two-wheel from the four-wheel differential-locked drive mode of operation or when a shift signal PS-L or PS-UL is provided to shift the center-differential gear assembly 4 between the four-wheel differential-locked and the four-wheel differential-free drive mode of operation, or a high power when a shift signal PS-4W is provided to shift the center-differential gear assembly 4 into the four-wheel differential-locked from the two-wheel drive mode of operation. The electric motor 61 produces a torque to displace the cam follower 57 with an axial force of approximately 20 kg under the supply of the low electric power and with an axial force of approximately 100 kg under the supply of the high electric power. Such differential power controllers are well known to those skilled in the art in various forms, so that a detailed description of the differential power controller will be unnecessary.

Although the present invention has been fully described by way of the preferred embodiment thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A transfer case operation mode shifting apparatus used on a vehicle equipped with four-wheel drive having a center-differential which is shiftable between at least four-wheel and two-wheel drive modes of operation, said apparatus comprising:
   center-differential shift means movable between at least two positions for shifting said center-differential between said at least four-wheel and two-wheel drive modes of operation; and
   an actuator for causing said center-differential shift means to move said center-differential between said at least two positions, said actuator comprising an electric motor cooperated with said center-differential shift means, and power transmitting means disposed between said electric motor and said center-differential shift means for differentially transmitting a driving power of said electric motor to said differential shift means, thereby actuating said differential shift means with different drive forces to move said center-differential shift means into said at least two positions so as to shift said center-differential from one of said at least two different drive modes of operation to the other drive mode of operation.

2. An apparatus as defined in claim 1, wherein said two different drive modes of operation are a four-wheel and a two-wheel drive mode of operation.

3. An apparatus as defined in claim 2, wherein said power transmitting mean transmits a driving power acting on said differential shift means lower when shifting said center-differential from said four-wheel to said two-wheel drive mode of operation that when shifting back said center-differential from said two-wheel to said four-wheel driving mode of operation.

4. An apparatus as defined in claim 1, wherein said two different drive modes of operation are a four-wheel differential-locked and a two-wheel drive mode of operation.

5. An apparatus as defined in claim 4, wherein said power transmitting means transmits a driving power acting on said differential shift means lower when shifting said center-differential from said four-wheel differential-locked to said two-wheel drive mode of operation than when shifting back said center-differential from said two-wheel to said four-wheel differential-locked drive mode of operation.

6. An apparatus as defined in claim 1, wherein said power transmitting means includes rotatable cam means engaged by a cam follower member of said differential shift means for displacing said differential shift means in parallel with the axis of rotation of said cam means, said cam means comprising at least two cam sections inclined at different angles with respect to said axis of rotation of said cam means.

7. An apparatus as defined in claim 6, wherein said rotatable cam means comprises a first cam section for displacing said differential shift means in one axial direction in parallel with said axis of rotation of said cam means so as to shift said center-differential into a four-wheel from a two-wheel drive mode of operation and a second cam section for displacing said differential shift means in the opposite axial direction so as to shift back said center-differential from said two-wheel to said four-wheel drive mode of operation, said first cam section having an angle of inclination with respect to said axis of rotation of said cam means larger than that said second cam section has.

8. An apparatus as defined in claim 7, wherein said rotatable cam means comprises a rotatable rod operationally coupled to said electric motor and a cam groove including said first and second cam sections formed on an outer periphery of said rotatable rod.

9. An apparatus as defined in claim 6, wherein said rotatable cam means comprises a first cam section for displacing said differential shift means in one axial direction in parallel with said axis of rotation of said cam means so as to shift said center-differential into a four-wheel differential-locked from a two-wheel drive mode of operation and a second cam section for displacing said differential shift means in the opposite axial direction so as to shift back said center-differential into said two-wheel from said four-wheel differential-locked drive mode of operation, said first cam section having an angle of inclination with respect to said axis of rotation of said cam means larger that that said second cam section has.

10. An apparatus as defined in claim 9, said rotatable cam means further comprise a third and a fourth cam section inclined in parallel with said first cam section for displacing said differential shift means in axial directions opposite to each other so as to shift and shift back said center-differential between a four-wheel differential-locked and a four-wheel differential-free drive mode of operation.

11. An apparatus as defined in claim 10, wherein said rotatable cam means comprises a rotatable rod operationally coupled to said electric motor and a cam groove including said first to fourth cam sections formed on an outer periphery of said rotatable rod.

12. An apparatus as defined in claim 1, wherein said power transmitting means includes power limit means for limiting said driving power to be transmitted to said center-differential shifting means lower when shifting said center-differential from said four-wheel to said two-wheel drive mode of operation than when shifting back said center-differential from said two-wheel to said four-wheel drive mode of operation.

13. An apparatus as defined in claim 12, wherein said power limit means comprises a driving member coupled to said electric motor and a driven member coupled to said center-differential shift means through cam means which are operationally coupled to each other by means of a spring and allowed to turn relatively to each other so as to compress and charge said spring with a torsional force, and releasing means for allowing said compressed spring to release said charged torsional force so as to return said drive and driven member when detecting a predetermined vale of torsional force charged in said spring.

14. An apparatus as defined in claim 13, wherein said releasing means comprises first and second limit switches adapted to detect different relative turned angles between said drive and driven members so as to stop said electric motor, thereby allowing said compressed spring to release said charged torsional force.

15. An apparatus as defined in claim 14, wherein said first limit switch detects a relative turned angle smaller than that detected by said second limit switch.

16. An apparatus as defined in claim 15 wherein said first limit switch is made active when shifting said center-differential from said four-wheel to two-wheel drive mode of operation and said second limit switch is made active when sifting back said center-differential from said two-wheel to said four-wheel drive mode of operation.

17. An apparatus as defined in claim 15, wherein said first limit switch is made active when shifting said center-differential from a four-wheel differential-locked to said two two-wheel drive mode of operation and said second limit switch is made active when shifting back said center-differential from said two-wheel to said four-wheel differential-locked drive mode of operation.

18. An apparatus as defined in claim 17, wherein said first limit switch is made active further when shifting said center-differential between said four-wheel differential-locked and a four-wheel differential-free drive mode of operation.

19. An apparatus as defined in claim 1, wherein said power transmitting means includes a spring so disposed as to be compressed when shifting said center-differential from said four-wheel to said two-wheel drive mode of operation.

20. A transfer case operation mode shifting apparatus used on a vehicle equipped with four-wheel drive having a center-differential which is shiftable between at least a four-wheel and a two-wheel drive mode of operation, said apparatus comprising:

center-differential shift means movable between at least two positions for shifting said center-differential between said four-wheel and two-wheel drive modes of operation;

an actuator including an electric motor for moving said differential shift means between said at least two positions; and power control means for applying different electric powers to said electric motor so as to move said differential shift means with a motive power lower when shifting said center-differential from said four-wheel to said two-wheel drive mode of operation than when shifting back said center-differential from said two-wheel to said four-wheel drive mode of operation.

* * * * *